(12) United States Patent
Pitsoulakis

(10) Patent No.: US 7,092,375 B2
(45) Date of Patent: Aug. 15, 2006

(54) MODEM HAVING FLEXIBLE ARCHITECTURE FOR CONNECTING TO MULTIPLE CHANNEL INTERFACES

(75) Inventor: George Pitsoulakis, Orland Park, IL (US)

(73) Assignee: Westell Technologies, Inc., Aurora, IL (US)

( * ) Notice: Subject to any disclaimer, the term of this patent is extended or adjusted under 35 U.S.C. 154(b) by 816 days.

(21) Appl. No.: 10/181,045

(22) PCT Filed: May 31, 2001

(86) PCT No.: PCT/US01/17532

§ 371 (c)(1),
(2), (4) Date: Jul. 12, 2002

(87) PCT Pub. No.: WO01/93048

PCT Pub. Date: Dec. 6, 2001

(65) Prior Publication Data
US 2003/0035471 A1    Feb. 20, 2003

Related U.S. Application Data

(60) Provisional application No. 60/207,955, filed on May 31, 2000.

(51) Int. Cl.
*H04Q 7/24* (2006.01)
(52) U.S. Cl. .................. 370/338; 375/222; 375/220
(58) Field of Classification Search ............ 370/493, 370/494, 395.53, 437, 352, 401, 402, 471, 370/355, 445, 463, 908, 338; 375/222, 220
See application file for complete search history.

(56) References Cited

U.S. PATENT DOCUMENTS

| | | | |
|---|---|---|---|
| 5,541,955 A | 7/1996 | Jocobsmeyer | 375/222 |
| 5,841,840 A | 11/1998 | Smith et al. | 379/93.01 |
| 5,909,559 A | 6/1999 | So | 395/307 |
| 5,910,959 A | 6/1999 | Olafsson et al. | 371/37.1 |
| 6,002,722 A | 12/1999 | Wu | 375/295 |
| 6,014,431 A | 1/2000 | McHale et al. | 379/93.14 |
| 6,044,403 A | 3/2000 | Gerszberg et al. | 709/225 |
| 6,345,072 B1 * | 2/2002 | Liu et al. | 375/222 |
| 6,711,138 B1 * | 3/2004 | Pai et al. | 370/257 |

OTHER PUBLICATIONS

Copy of the International Search Report for PCT/US01/17532 dated Jul. 25, 2001.

* cited by examiner

*Primary Examiner*—Chi Pham
*Assistant Examiner*—Alexander O. Boakye
(74) *Attorney, Agent, or Firm*—McDonnell Boehnen Hulbert & Berghoff LLP

(57) ABSTRACT

The present invention is directed to an integrated access device (IAD) that provides multiple communication interfaces for communications to a variety of service providers. The disclosed IAD acts as a DSL modem and combines the functions of a gateway, router, and Ethernet hub to provide high-speed Internet access to PCs sharing a local network. It provides the networking functions that let PCs connect through a variety of methods, including traditional Ethernet, wireless, universal serial bus (USB), and home phoneline networking alliance (HPNA). It also provides point-to-point protocol over Ethernet (PPPOE) tunneling through network address translation (NAT).

6 Claims, 15 Drawing Sheets

MODEM HAVING FLEXIBLE ARCHITECTURE FOR CONNECTING TO MULTIPLE CHANNEL INTERFACES

RELATED APPLICATIONS

The present invention claims priority to U.S. Provisional application No. 60/207,955, filed May 31, 2000, whose contents are incorporated by reference.

FIELD OF THE INVENTION

The present invention generally relates to a communications modem. More specifically, the present invention relates to a communications modem which can be interfaced to number of different channels.

BACKGROUND OF THE INVENTION

Digital Subscriber Line (xDSL) is a technology which allows for simultaneous voice arid data traffic to coexist over a communication channel comprising a standard telephone transmission line. Typically, a standard telephone transmission line comprises an unshielded twisted pair of copper wire having a gauge of 22-26AWG. Twisted pairs, which can be used to connect a central telephone system (a 'central' unit) to a subscriber's telephone (a 'remote' unit) can support bandwidths of up to 2 MHz through the use of digital signal processing (ASP) technology. Thus, they can be used for bandwidth-intensive applications, such as Internet access and video-on demand, as well as for carrying voice traffic. Frequency division multiplexing is used so that a puality of signals, each occupying a different frequency band, can be simultaneously sent over the same transmission line.

The voice traffic band comprises a number of frequency subbands, or channels, ranging from DC to 20 KHz The analog voice band frequency is typically specified as 200–4000 Hz Customer specified additions may include phone operation up to 8 KHz in addition to 12–16 KHz billing tones. In addition, DC to 30 Hz frequencies are typically assigned for auxiliary analog signaling purposes, such as ringing the telephone, dial pulsing and ontoff hook signaling.

ADSL data traffic bandwidth for Discrete Multitone (DMT) modulation is typically from 25 KHz–1.1 MHZ. Of this, upstream data traffic (i.e., remote unit to central unit) uses the 25 KHz–138 KHz band, while the downstream traffic (i.e., central unit to remote unit) uses the 138 KHz–1 MHZ band.

U.S. Pat. No. 5,541,955 discloses an adaptive data rate modem, The modem incorporates an adaptive data rate encoder and an adaptive data rate decoder using adaptive, parallel-branch decoding to translate received symbols into corresponding data bits. The data rate is changed automatically and dynamically without interrupting the decoding process. A constant channel symbol rate and a single signal set simplify signal acquisition and synchronization. Incoming and outgoing data are buffered, and the transmission rate is changed dynamically by a memory controller to avert buffer overflows and underflows. An optional adaptive phase-lock loop system maintains synchronization of the decoder at all data rates.

U.S. Pat. No. 5,841,840 discloses a multiple line modem and method enabling a user to automatically usurp a plurality of telephone lines for data transfer when the telephone is not in use. A user is able to switch from multiple line data operation to one (Or move) line data and one (or more) line telephone operation automatically when the telephone handset is lifted or an incoming call is detected signaling a request for voice service. The multiple line modem automatically reestablishes the data connection on the line(s) that was used for voice service when the voice service terminates. The multiple line modem allows end to end service that is transparent to the central office. When all lines are operating in data transfer mode, the aggregate data transfer rate is multiplied by the number of lines available for data transport When one line(s) is operating in voice service mode, the other line(s) maintains data transfer operation at a reduced rate. The line(s) that is used for voice service is adaptively managed by the multiple line modem to provide seamless switching between data transfer mode operation when voice service is not requested and voice service mode operation when voice service is requested.

U.S. Pat. No, 5,910,959 discloses a methodology for a modem control channel. The channel allows faster seamless rate change and precoder tap exchange than the baseline procedure for seamless rate change, allowing for more robust transmission of control information It can also be used to convey side-information in the case of multiple data applicatiors, serving the purpose of mode switching. Thus, with a single control channel both the needs for seamless rate change and transmitting control information for multiple data applications can be met.

U.S. Pat. No. 6,002,722 discloses a modem operating selectively in the voice frequency and higher frequency bands which supports multiple line codes. A DSP is used to implement different existing ADSL line codes on the same hardware platform. The modem negotiates in real time for a desired line transmission rate to accommodate line condition and service cost requirements which may be implemented at the beginning of each communication session by exchange of tones between modems. A four step MDSL modem initialization process provides line code and rate compatibility. The handshake protocol and receiver algorithm allow reliable modem synchronization over severely amplitude distorted channels and makes use of a short length sequence to train a synchronizing equalizer at the receiver. The algorithm and corresponding training sequence to train the transmitter filter are provided. After training to this sequence, a matched filter or correlator detects the inverted sync sequence. Detection of the inverted sequence signals commencement of normal reference training of the demodulation equalizers. An internal state machine in an MDSL modem records and monitors line status and notifies state change to other MDSL and host processor. The protocol for exchanging line connection management messages is a simplified LCP for MDSL. In a DMT system, a transmitter filter reduces the length of effective channel impulse response. Implementation of the filter combines time domain convolution and frequency domain multiplication to reduce needed computation power. The filter coefficients update may occur through a feedback channel.

The contents of aforementioned U.S. Pat. Nos. 5,541,955, 5,874,840, 5,910,959, and 6,002,722 are incorporated by reference to the extent necessary to understand the present invention

SUMMARY OF THE INVENTION

The present invention is directed to an xDSL modem including a controller having a computer memory associated therewith, wherein the controller is configured to simultaneously support both a wireless Local Area Network (LAN) and a home phoneline networking alliance (HPNA) connection.

The present invention is also directed to an xDSL modem comprising a controller having a computer memory associated therewith; software resident in said computer memory, said software comprising preloaded software drivers configured to support a plurality of PCMCIA cards; at least one PCMCIA slot accessible from an exterior surface of the modem; and at least one port configured to accept a new software driver suitable for cooperating with a PCMCIA card for which no suitable software driver is already resident in said computer memory, wherein upon insertion of a PCMCIA card, a proper software driver is automatically invoked, if said proper software driver is resident in said computer memory.

The present invention is fier directed to an xDSL modem comprising a motherboard having a controller having a first computer memory associated therewith; and at least one voice expansion slot connected to the motherboard; wherein the xDSL modem is convertible into a voice-capable device, upon insertion of a voice card in the voice expansion slot, Such an xDSL modem may further comprise a voice card comprising at least one digital signal processor (ASP) unit and at least one subscriber line interface circuits (SLIC), the voice card being configured to support at least one coder-decoder (codec) standard and at least one voice protocol. In addition, the codec standard may include standards from the group consisting of G.711, G.726, G.723.1, G.729A and G.728, while the voice protocol may include standards from the group consisting of MGCP, SIP, H.323, H.248/MEGACO.

The present invention is also directed to an xDSL modem comprising a wireless Local Area Network (LAN) connection, a home phoneline networking alliance (HPNA) connection an ethernet connection, an universal serial bus (USB) connection. Additional features may include one or more PCMCIA slots, a voice expansion slot, an audio port; and a serial port.

BRIEF DESCRIPTION OF THE DRAWINGS

The present invention is described in detail below with reference to the draings in which.

DETAILED DESCRIPTION OF PREFERRED EMBODIMENTS

Figure 1:
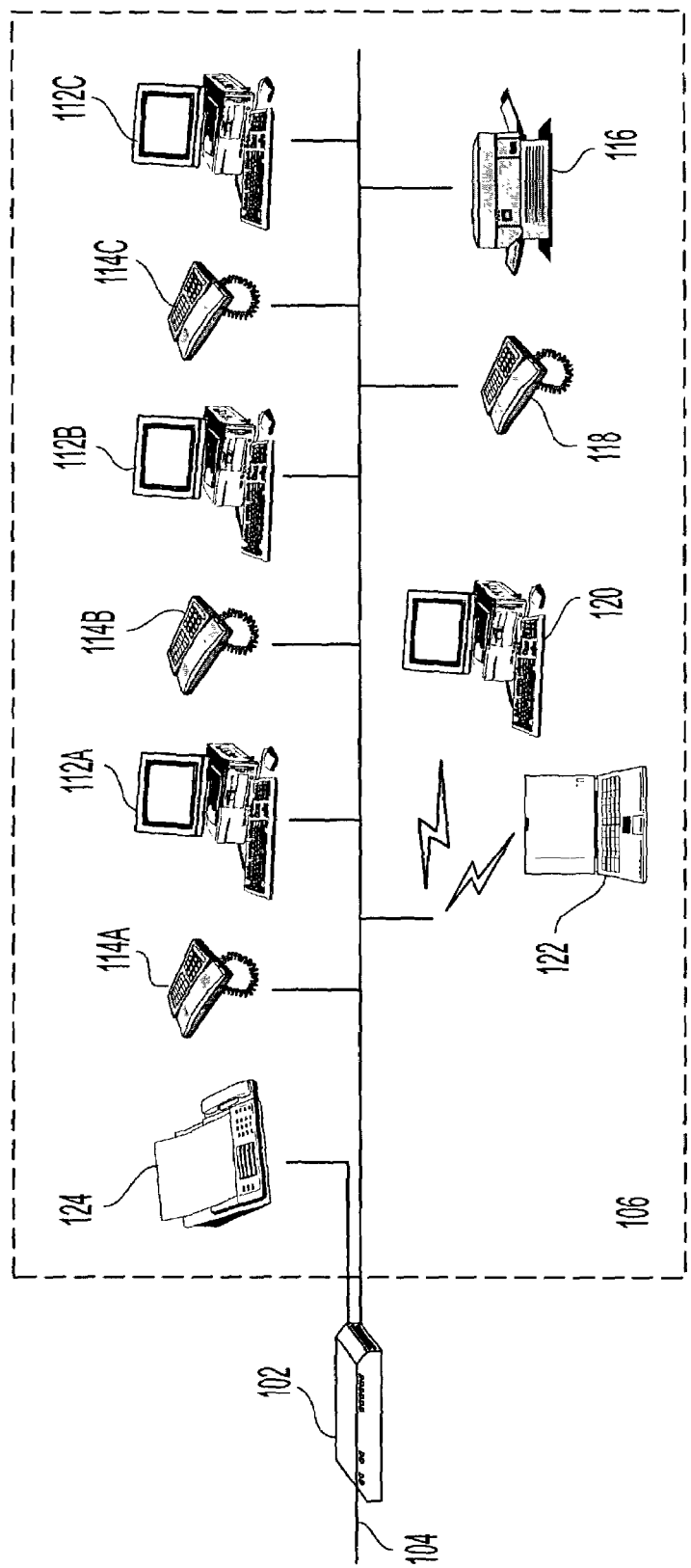
FIG. 1 presents a block diagram of an access system which incorporates an integrated access device (IAD) in accordance with the present invention.

FIG. 1 is a block diagram of an access system which incorporates an integrated access device (IAD) in accordance with the present invention. As shown in FIG. 1, the access system 100 comprises an access device 102, a transmission line 104 which is connected to the access device 102, and a network 106 which is also connected to the access device 102. The transmission line 104 can be a single digital subscriber line (DSL) line. The access device 102 is an IAD. It allows users to physically network multiple client computers and phones together to share a single DSL line and Internet connection. As shown in FIG 1, the network 106 connects a plurality of computers 112A, 112B, and 112C, such as personal computers (PCs), a plurality of telephone equipment 114A, 114B, and 114C, such as telephone sets and FAX machines 124, ancillaries 116 such as printers and scanners, IP phone 118, such as VoIP (voice over Internet protocol (IP)), VoDSL (voice over DSL), and VoATM (voice over asynchronous transfer mode (ATM)). The network 106 can also be Tirelessly connected to remotely located computers 120 and mobile computers 122 such as laptops and personal data assistants (PDAs).

Figure 2:
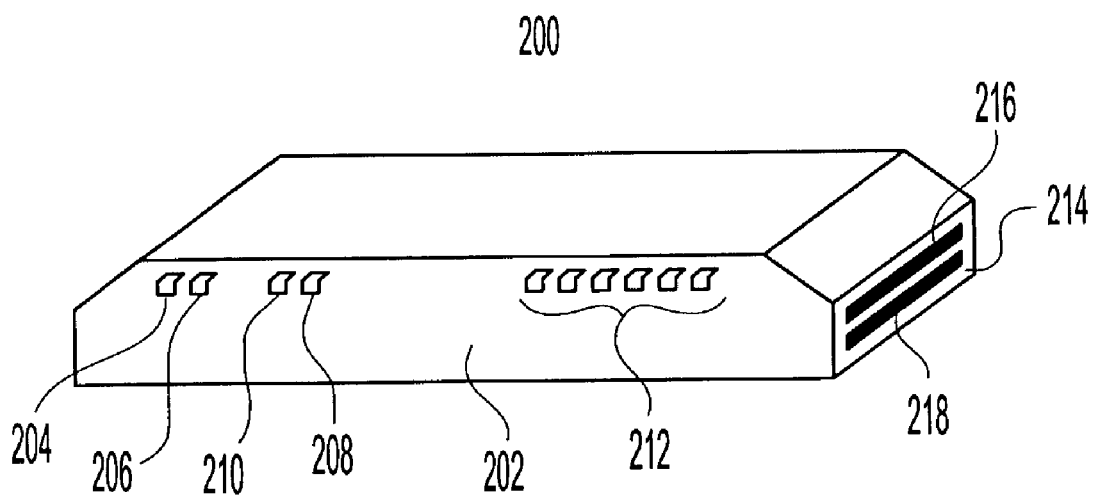
FIG. 2 is a front perspective view of one embodiment of the access device according to the present invention.

FIG. 2 is a front perspective view of one embodiment of the access device according to the present invention. In the access device 200 shown in FIG. 2, there is a plurality of Light Emitting Diode (LEDs) and two personal computer memory card international association (PCMCIA) card ports.

At the front is a LED panel 202, located on which are a power LED 204, a DSL LED 206, a first PCMCIA LED 208, a second PCMCIA LED 210, and an activity LED group 212. These LEDs, as will be discussed in detail below, indicate the status and activities of various components of the access device 200. Located on one side of the access device 200, as shown in FIG. 2, is a port panel 214, which contains a first PCMCIA port 216 and a second PCMCIA port 218. These two ports receive PCMCIA cards, including PCMCIA cards that support wireless communications such as for establishing a virtual private network (VPN).

The power LED 204 indicates the application of power to the access device 200. When power is on, the power LED 204 shows green light Otherwise, when the power is off, the green light is off. The DSL LED 206 indicates the DSL connection and the synchronization with asymmetric DSL (ADSL) transceiver unit (ATU). When DSL is connected and is synchronized with ATU-C (ATU central), the DSL LED 206 shows green light. When DSL is connected and is not synchronized with ATU-C, the DSL LED 206 shows yellow light. When there is no DSL connection, the DSL LED 206 shows no light. The first PCMCIA LED 208 indicates the status of the first PAMCIA port 216. When PCMCIA port 216 has a PCMCIA card plugged in, the PCMCIA LED 208 shows green light. Otherwise, when PCMCIA port 216 does not have a PCMCIA card plugged in, the PCMCIA LED 208 shows no light Similarly, the second PCMCIA LED 210 indicates the status of the second PAMCIA port 218. When PCMCIA port 218 has a PCMCIA card plugged in, the PCMCIA LED 210 shows green light. Otherwise, when PCMCIA port 218 does not have a PCMCIA card plugged in, the PCMCIA LED 210 shows no light Finally, the activity LED group 212 comprises a plurality of LEDs to indicate the activity of the access device 200 on a 0–100% scale. Preferably, there are 6 LEDs, with the one on the left lighting up most frequently even if there is little activity and the one on he right lighting up only when the activity reaches near 100%. Table 1 summarizes the indication of all the LEDs on the LED panel 202 of the access device 200.

Figure 3:
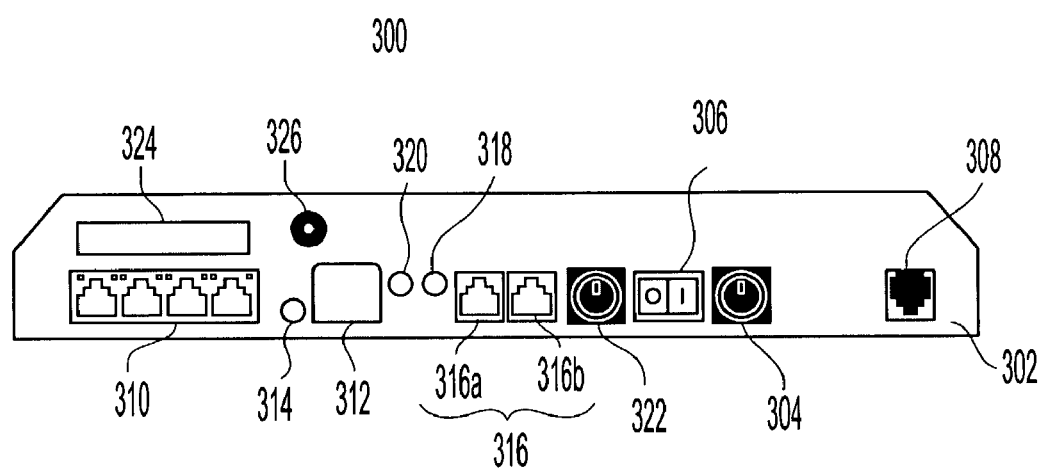
FIG. 3 is a rear view of one embodiment of the access device according to the present invention.

FIG. 3 is a rear view of one embodiment of the access device according to the present invention. In the access device 300 shown in FIG. 3, at the rear side is a connection panel 302. A plurality of ports and slots are located on the connection panel 302 for connections. Power adapter port 304 accepts a power cord, preferably with 24V AC transformer, and is controlled by power switch 306. DSL port 308 receives a DSL transmission line. Ethernet port 310 comprises 4 Ethernet hubs for wired networking with computers. USB slot 312 is for universal serial bus (USB) connection with computers and its connection states is indicated by USD link LED 314. When there is a USB connection, a USB link LED 314 shows green light. Otherwise, when there is no USB connection, the USB link LED 314 shows no light. Dual HPNA port 316 is for home phoneline networking

TABLE 1

Indications of LEDs on the LED panel.

| LED | No Light | Color | Light |
|---|---|---|---|
| power LED 204 | power off | green | power on |
| DSL LED 206 (dual color) | no DSL connection | green<br>yellow | DSL connected and synchronized with ATU-C<br>DSL connected and but not synchronized with ATU-C |
| first PCMCIA LED 208 | first PCMCIA card not plugged in | green | first PCMCIA card plugged in |
| second PCMCIA LED 210 | second PCMCIA card not plugged in | green | second PCMCIA card plugged in |
| activity LEDs 212 | no activity | green | activity on a 0–100% scale | alliance (HPNA) connection. It comprises a first jack 316b for phone connection and a second jack 316a for line connection, with their connection status indicated by an HPNA link LED 318 and their activity stanus indicated by an HPNA activity LED 320. When there is an HPNA connection, the HPNA link LED 318 shows green light. Otherwise, when there is no HPNA connection, the HPNA link LED 318 shows no light. Also, when there is an HPNA connection, the HPNA activity LED 320 flashes green light in a frequency relative to the intensity of the activities over the HPNA connection. Serial port 322 is for connection to telemetry service input. The telemetry service includes remote control, among other functionalities. Voice slot 324 is for telephony service input. Preferably, it comprises up to 4 RJ-11 connections. The telephony service includes VoIP (voice over IP) and VoATM (voice over ATM). Audio-in port 326 is for music-on-hold input The indications of the LEDs of the connection panel 302 shown in FIG. 3 and FIG. 4, below, are summarized in Table 2. It is understood that the lights, slots, connections and other features may appear on panels and surfaces of the access device other than the ones in the preferred embodiment.

Figure 4:
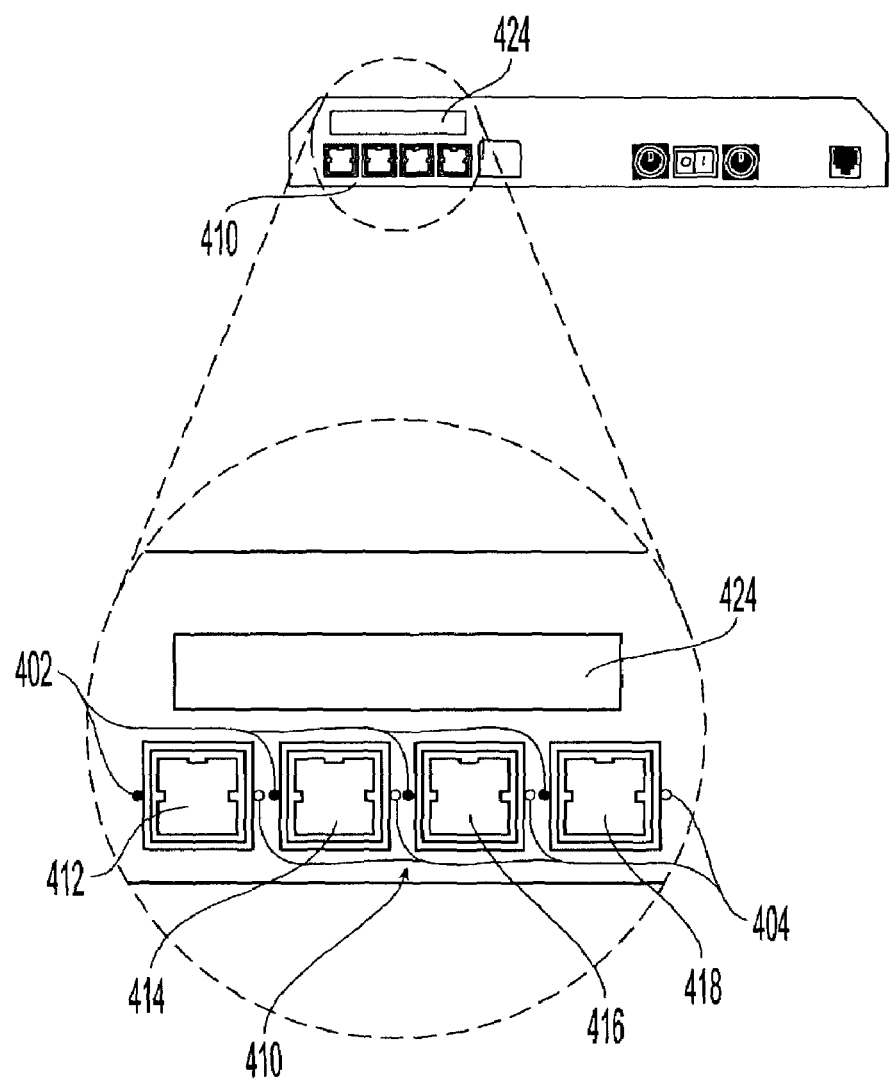
FIG. 4 is a close-up view of a portion of the rear view of one embodiment of the access device according to the present invention.

FIG. 4 is an enlarged view of a portion of the rear view of one embodiment of the access device according to the present invention As shown in FIG. 4, located below a voice slot 424 is an Ethernet port 410, which comprises 4 Ethernet hubs 412, 414, 416, and 418. There are four Ethernet link LEDs 402 and four Ethernet activity LEDs 404. For each Ethernet hub, an Ethernet link LED 402 indicates its link status and an Ethernet activity LED 404 indicates its activity status. When there is an Ethernet connection at an Ethernet hub, the associated Ethernet link LED 402 shows green light Otherwise, when there is no Ethernet connection at the Ethernet hub, the associated Ethenmet link LED 402 shows no light. Also, when there is an Ethernet connection, the associated Ethernet activity LED 404 flashes yellow light in a frequency relative to the intensity of the activities over the Ethernet connection. The indications of the LEDs of the connection panel 302 shown in FIG. 4 and FIG. 3, above, are stummarized in Table 2. It should be noted that other numbers of Ethernet hubs may be provided

TABLE 2 indication of LEDs on the connection panel.

| LED | No Light | Color | Solid Light | Flashes |
|---|---|---|---|---|
| USB link LED 314 | no USB connection | green | USB connected | N/A |
| HPNA link LED 318 | no HPNA connection | green | HPNA connected | N/A |
| HPNA activity LED 320 | no activity | green | N/A | activity |
| Ethernet link LED 402 | the associated Ethernet hub not connected | green | the associated Ethernet hub connected | N/A |
| Ethernet activity LED 404 | no activity | yellow | N/A | Tx/Rx activity |

With the capacity of providing a variety of options, an access device in accordance with the present invention can satisfy different users having different needs. For example, for home networking, the access device 200 provides Internet access to multiple users simultaneously over a single telephone line, while retaining the benefit of bringing voice service to the home on the same telephone line as the Internet service. For small office networking, the access device 200 provides multiple local area network (LAN) options with multiple interfaces, such as Ethernet, HPNA, and wireless LAN (WLAN), all over a single ADSL connection. For home office or telecommunicating, the access device 200 provides virtual private networking (VPN), separates FAX and voice lines, and brings private branch exchange (PBX) functions.

Figure 5:
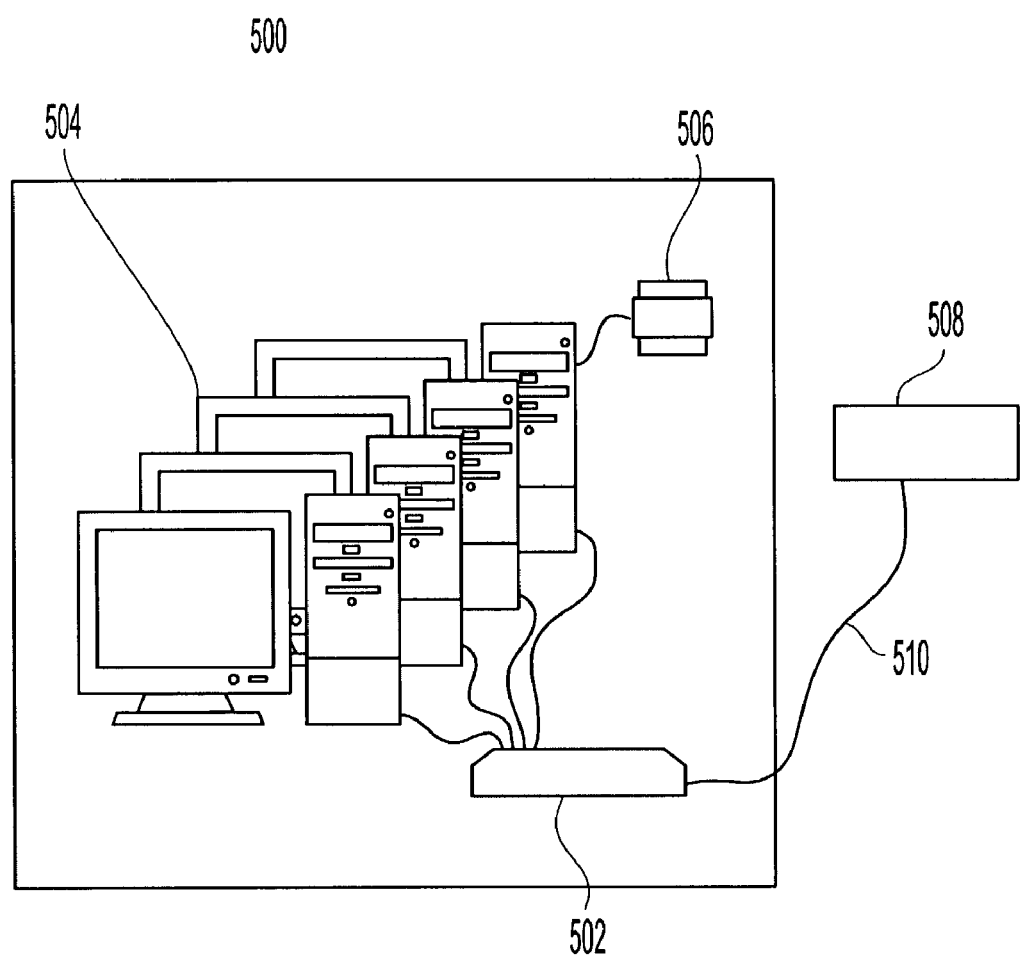
FIG. 5 shows an Ethernet network with an access device according to the present invention.

FIG. 5 shows an Ethernet network with an access device according to the present invention. As shown in FIG. 5, the Ethernet network 500 comprises an access device 502, a plurality of computers, shown generally as 504, and at least one peripheral 506. Each of the plurality of computers 504 is connected to an Ethernet hub on the access device 502. The peripherals 506 can be devices such as printers and scanners and are connected to the computers 504, The access device 502 is connected to a single DSL line 510 through which DSL services are provided by a DSL service provider, shown generally as 508. In the Ethernet network 500, each computer 504 has DSL access through the single DSL line 510. Also, each computer 504 has access to shared files and peripherals 506. Preferably, the access device has up to four wired Ethernet connections. Additional computers may be added through the use of additional Ethernet hubs.

Figure 6:
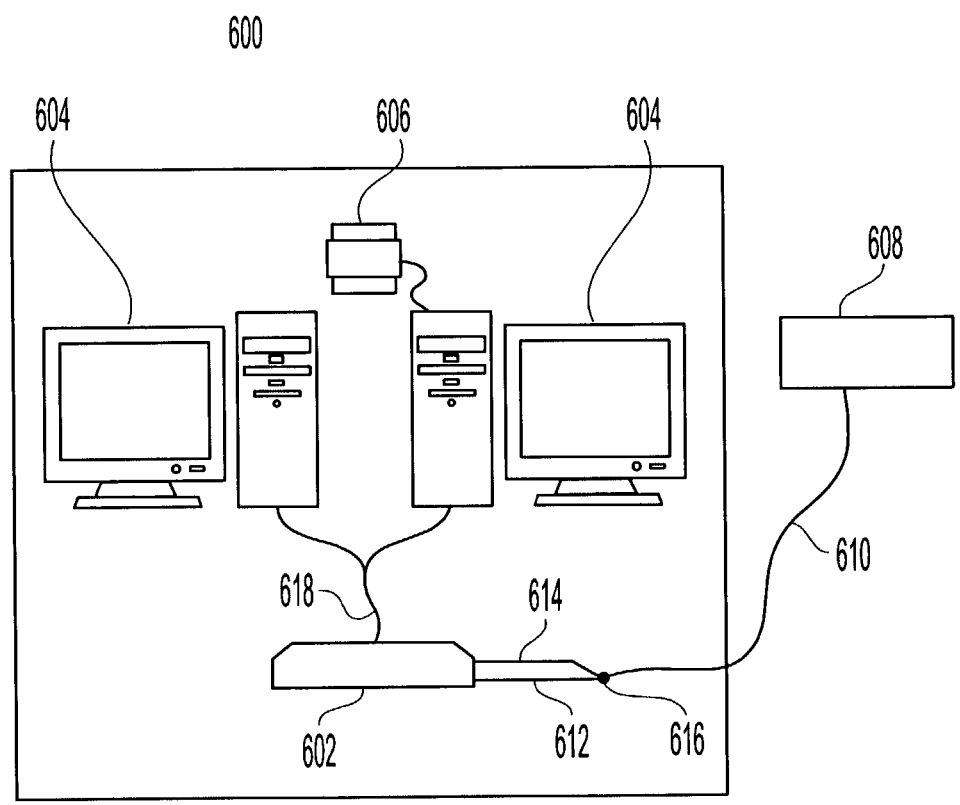
FIG. 6 shows an HPNA network with an access device according to the present invention.

FIG. 6 shows an HPNA network with an access device according to the present invention As shown in FIG. 6, the HPNA network 600 comprises an access device 602, a plurality of computers 604, and peripherals 606. Each computer 604 is connected to the access device 602 via a telephone line 618. A dual jack 616 receives input from a single DSL transmission line 610 through which DSL services are provided by a DSL service provider 608. The dual jack 616 is connected to the access device 602 via both an HPNA line 612 and a DSL connection line 614. In the HPNA network 600, each computer 604 has DSL access over the single DSL line 610. Also, each computer 604 has access to shared files and peripherals 606.

Figure 7:
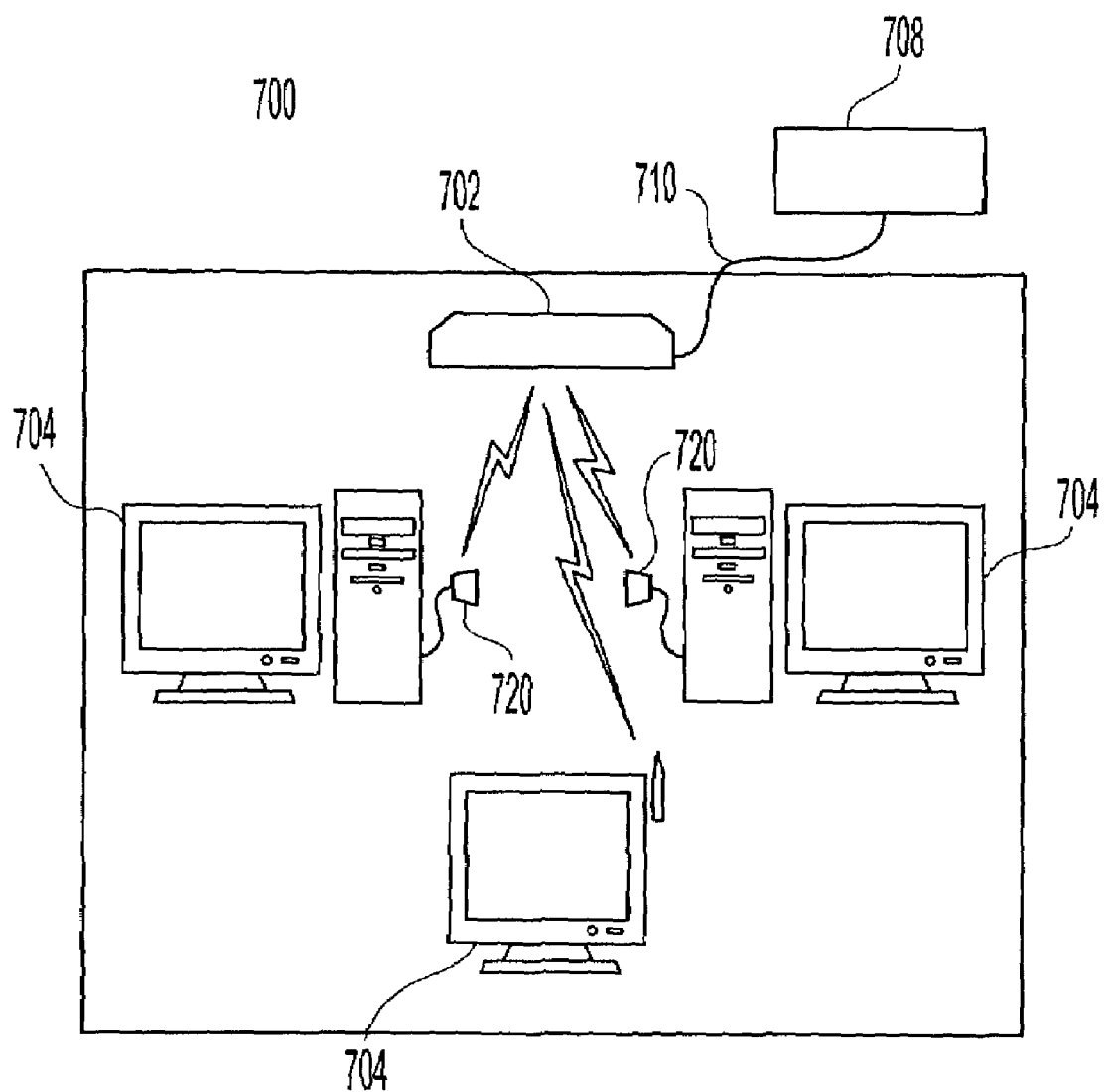
FIG. 7 shows a wireless network with an access device according to the present invention.

FIG. 7 shows a wireless network 700 with an access device 702 according to the present invention. As shown in FIG. 7, the wireless network 700 comprises an access device 702 and a plurality of computers 704. Each computer 704 is connected to the access device 702 by radio signals transmitted and received by a radio transmitter 720 attached to each computer 704. The access device 702 is connected to a single DSL line 710 through which DSL services are provided by a DSL service provider 708. Also, a PCMCIA card with Wireless LAN (WLAN) capabilities is plugged into the access device 702 to enable the access device 702 to use the radio signals. Preferably, the PCMCIA card uses a home radio frequency (HRF) card In the wireless network 700, each computer 704 has DSL access over the single DSL line 710.

Figure 8:
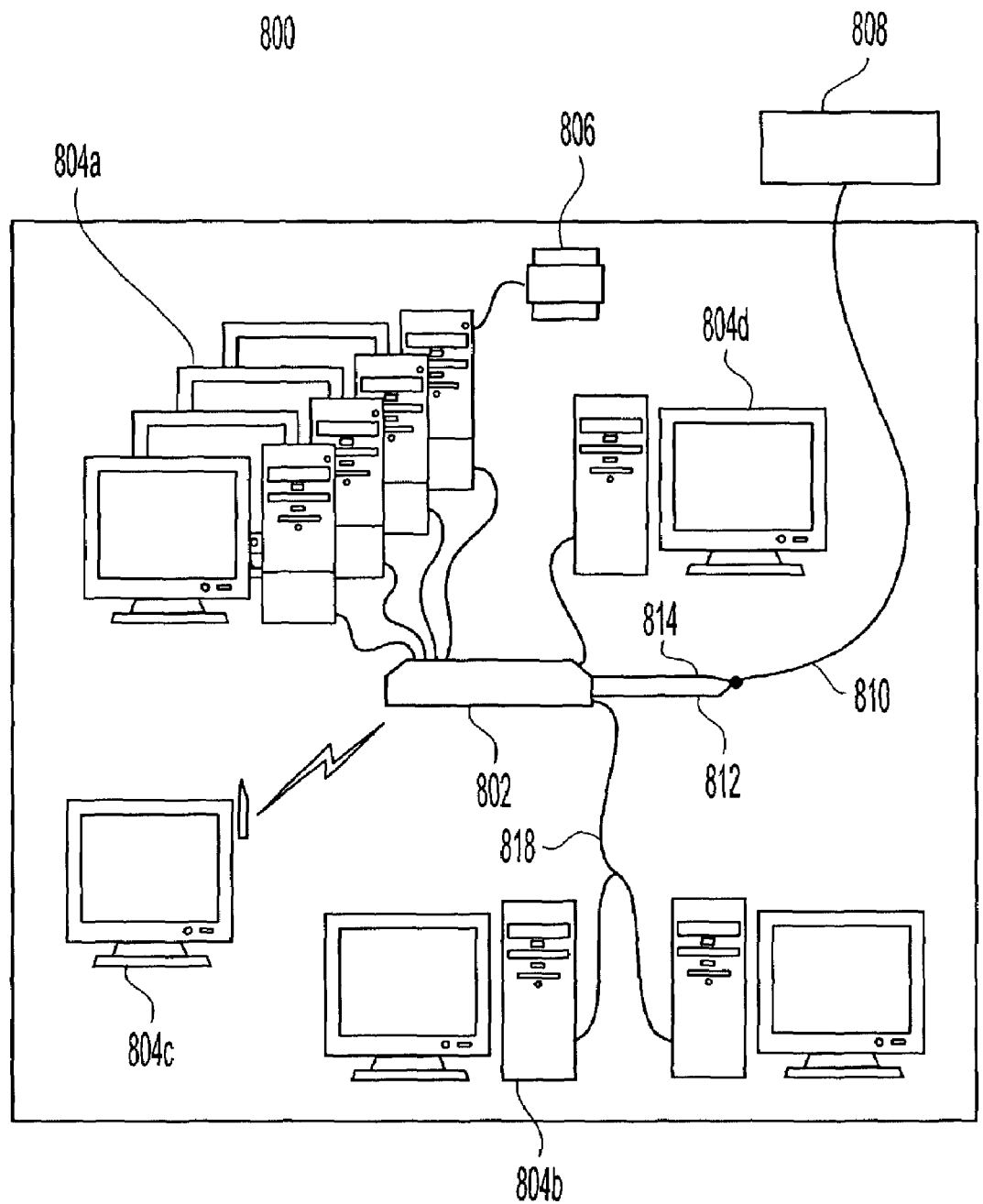
FIG. 8 shows a hybrid network with an access device according to the present invention.

FIG. 8 shows a hybrid network 800 with an access device 802 according to the present invention. It is a network which combines the features of the Ethernet network of FIG. 5, the HPNA network of FIG. 6, and the wireless network of FIG. 7. In addition, it also involves the use of the USB connection of the access device. As shown in FIG. 8 the hybrid network 800 comprises an access device 802, one or more Ethernet-enabled computers 804a, one or more HPNA-enabled computers 804b, one or more wireless-enabled computers 804c, a USB-enabled computer 804d, and peripherals 806. The Ethernet computers 804a are computers connected to the Ethernet hubs on the access device 802, the HPNA computers 804b are computers connected to the HPNA connections via a telephone line 818 on the access device 802, the USB computer is a computer connected to the USB connection of the access device 802, and the wireless computers 804c are computers connected to the access device 802 via radio or even light signals. The peripherals 806 are connected to the computers. A dual jack 816 receives input from a single DSL transmission line 810 through which DSL services are provided by a DSL service provider 808. The dual jack 816 is connected to the access device 802 via both an HPNA line 812 and a DSL connection line 814. In the hybrid network 800, each computer has DSL access through the single DSL line 810. Also, each computer has access to shared files and peripherals 806.

Figure 9:
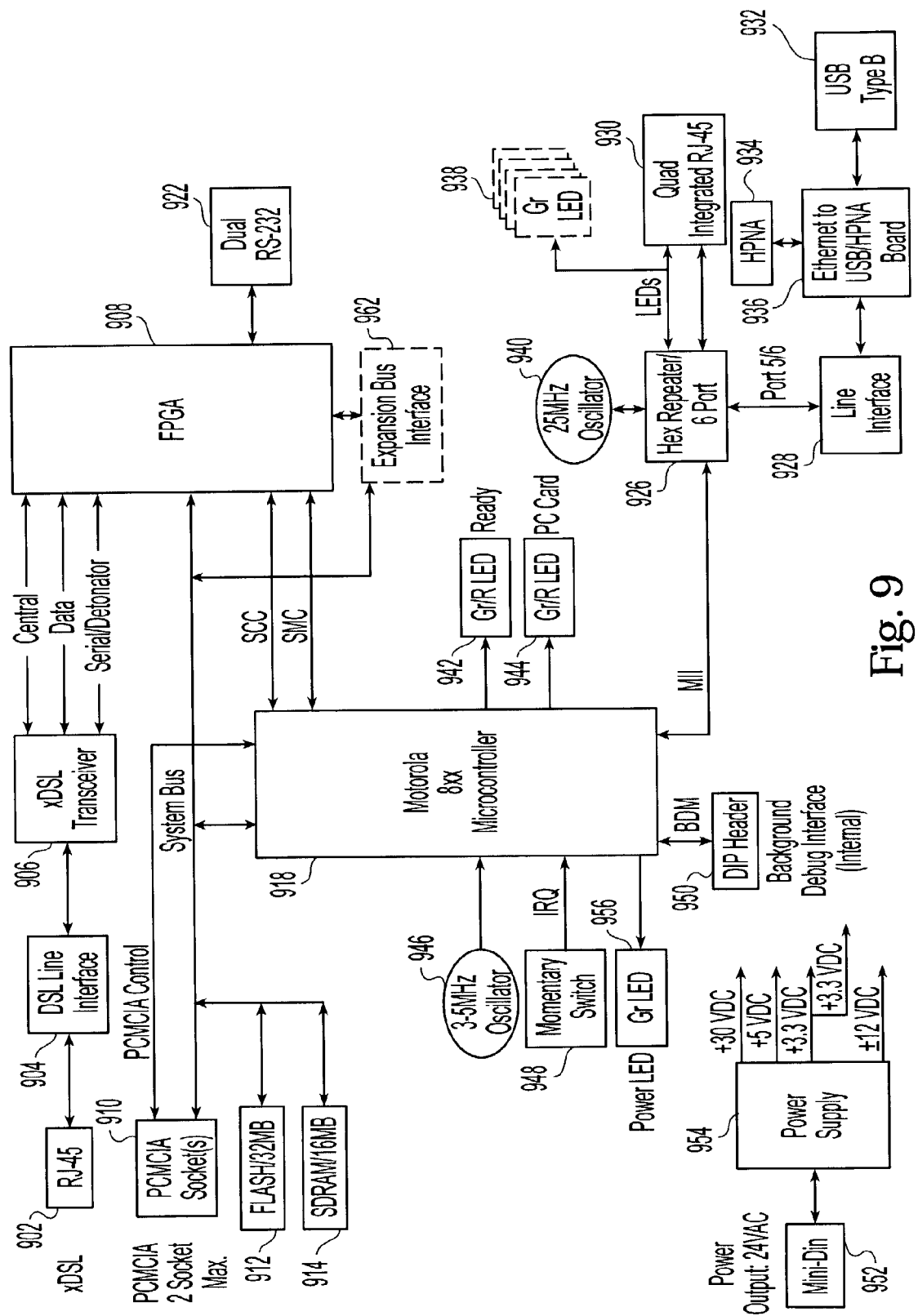
FIG. 9 is a block diagram of one embodiment of the access device in accordance with the present invention.

FIG. 9 is a block diagram of one embodiment of the access device in accordance with the present invention. It shows the major components on the mother board of the access device. As shown in FIG. 9, access device 900 comprises a DSL jack 902, a DSL line interface 904, and an xDSL transceiver 906. The DSL jack 902, DSL line interface 904, and xDSL transceiver 906 function as an ADSL transceiver unit (ATU) and support IP forwarding (routing) and point-to-point protocol (PPP). The DSL jack 902 receives a DSL line. The DSL line interface 904 interces with DSL signals coming from the DSL line. It may also function as a POTS (plain old telephone system) filter The xDSL transceiver 906 is a network adapter which transmits and receives the DSL signals. It also supports software downloading. Having the functions as an ATU and those that will be discussed in detail below, the access device acts as a DSL modem and combines the fictions of a gateway, router, and Ethernet hub to provide high-speed Internet access to PCs sharing a local network. It provides point-to-point protocol over Ethernet (PPPOE) tunneling through network address translation (NAT). Preferably, the DSL jack 902 is a registered jack-45 (RJ-45) and the xDSL transceiver 906 is an ALCATEL® ADSL DMT chipset (MTK-20140). DSL line interface is well known in the art. Table 3 lists the preferred products for the major components shown in FIG. 9, except those well known in the art. In a preferred embodiment, the DSL jack 902 corresponds to the DSL port 308 of FIG. 3.

The access device 900 also comprises PCMCIA sockets 910 for acceptance of PCMCIA cards, flash memory 912 into which software drivers and the like may be stored or downloaded, and SDRAM 914. These components constitute a PCMCIA interface and function to receive and service PCMCIA cards. This PCMCIA interface preferably supports 16 bit type-II PCMCIA cards. It also support Bluetooth and other protocols. Supported PCMCIA cards include conventional PC cards, such as streaming video and video capture cards, as well as WLAN cards, such as Bluetooth, IEEE802.11a, IEEE802.11b, HomeRF,

TABLE 3

The preferred products for the major components shown in FIG. 9.

| Component | Preferred product |
| --- | --- |
| DSL jack 902 | RJ-45 jack |
| xDSL transceiver 906 | ALCATEL ® ADSL DMT chipset (MTK-20140) |
| FPGA 908 | Altera ® gate array |
| PCMCIA sockets 910 | standard 64 pin sockets |
| flash memoy 912 | SHARP ® 32 Mb flash memory |
| SDRAM 914 | SHARP ® 16 Mb SDRAM |
| microcontroller 918 | Motorola ® M855 processor |
| serial connector 922 | dual RS-232 connector |
| LAN repeater 926 | Hex repeater with 6 ports |
| Ethernet jacks 930 | Quad Integrated RJ-45 jacks |
| USB port 932 | Type-B USB |
| HPNA port 934 | telephone jack |
| LAN oscillator 940 | 25 MHz oscillator |
| microcontroller oscillator 946 | 3–5 MHz oscillator |

HiperLAN, HiperLAN2, and RadioLan 10 Mbps WLAN PCMCIA cards. Listed in Table 4 are some of the applications supported by the PCMCIA interface. Also, listed in Table 5 are some of the modes of operation supported by the PCMCIA interface, Preferably, the number of sockets in PCMCIA sockets 910 is 2, the PCMCIA sockets 910 are standard 64 pin sockets, the flash memory 912 is a SHARP® 32 Mb flash memory, and the SDRAM 914 is a SHARP® 16 Mb SDRAM. In a preferred embodiment, the PCMCIA sockets 910 correspond to the first and second PCMCIA ports 216 and 218 of FIG. 2. The PCMCIA cards can be plugged and unplugged easily. They can be changed according to needs. For example, a user can use different plug-ins for different applications. Also, the user can update versions of applications by plugging in a PCMCIA card of a newer version. It is noted that changing PCMCIA cards does not affect the design of the access device 900.

TABLE 4

Applications supported by the PCMCIA interface.

| Application | Card Type |
| --- | --- |
| Wireless LAN 802.11 | I/O |
| Wireless LAN proprietary | I/O |
| Wireless local loop | I/O |
| Bluetooth, HomerRF (SWAP) | I/O |
| DOCSIS 1.0 Cable Modem | I/O |
| HPNA | I/O |
| TI ISDN PRI | I/O |
| DAML | I/O |
| MPEG II Video | I/O |
| HDSL2 | I/O |
| SDSL | I/O |
| Home Security | I/O |
| Cordless Phone base unit (DECT, VoIP) | I/O |
| Security and encryption card | memory |

TABLE 5

Modes of operation supported by the PCMCIA interface.

| Number | Mode |
| --- | --- |
| 1 | Wireless peer-to-peer networking (LAN) or Ethernet Bridge |
| 2 | Wireless HUB networking (Router) |
| 3 | Point-to-point WLL |
| 4 | Point-to-multpoint WLL |
| 5 | ISDN BRI/PRI (for SDSL/SHDSL/HDSL applications) |
| 6 | MEG II video distribution |
| 7 | DAML support (2–4 channel) |
| 8 | HDSL/SDSL interface |
| 9 | Dial-up or derived connection for aggregation of security signals (for security interfaces) |
| 10 | Cordless Phone Base Unit |
| 11 | Zoomed Video |
| 12 | Hardware keys, 3DES, or SIM (for security and encryption) |

The access device 900 may also comprise field programmable gate array (FPGA) 908 and microcontroller 918. Microcontroller 918 preferably is a microprocessor. FPGA 908 and microcontroller 918 communicate with each other and process signals from the xDSL transceiver 906 and the PCMCIA cards at the PCMCLA sockets 910. The FPGA 908 communicates with the xDSL transceiver 906 through a system bus to receive signals such as data, control, and serial/detonator. Alternatively, the microcontroller 918 may communicate with the FPGA 908 through an ATM Utopia interface and a dedicated control interface. The FPGA 908 communicates with the PCMCIA cards through a system bus and microcontroller 918 communicates with the PCMCIA cards through a system bus and a PCMCIA control. A software driver is provided to each individual PCMCIA card, Such drivers can be downloaded by ways such as floppy disk, CD, or network access to a service provider. Preferably, the FPGA 908 is an Altera® gate array and the microcontroller 918 is a Motorola® M855 processor. It supports AAL5 encapsulation of Ethernet frames according to known RFC (Request For Comments) specifications.

The access device 900 further may comprise a serial connector 922, which is connected to the FPGA 908 and functions to receive telemetry services, such as a remote radio frequency (RF) control, a radio device or the like, a low speed serial wireless networking, or a utility meter reader. In a preferred embodiment, however, the serial connector 922 is a dual RS-232 connector and is self-powered. In a preferred embodiment, the DB connector 924 corresponds to the serial port 322 of FIG. 3.

The access device 900 further may comprise a LAN repeater 926, line interface 928, Ethernet jacks 930, USB port 932, HPNA port 934, board 936, Ethernet LEDs 938, and LAN oscillator 940. These components function for LAN networking. The Ethernet jacks 930 provide Ethernet connections to computers. Preferably, the number of jacks in the Ethernet jacks 930 is 4, the Ethernet jacks 930 are Quad Integrated RJ-45 jacks, and the Ethernet connections are through 10 base T hubs. A line interface is well known in the art. The status and activities of the Ethernet connection are indicated by Ethernet LEDs 938. In a preferred embodiment, the Ethernet jacks 930 correspond to the Ethernet ports 310 of FIG. 3 and the Ethernet LEDs 938 correspond to the Ethernet link LEDs 402 and Ethernet activity LEDs 404 of FIG. 4.

The USB port 932 provides USB connection to computers. Preferably, it is a Type B USB. The status of the USB connection is indicated by a USB LED (not shown). In a preferred embodiment, this LED corresponds to the USB link LED 314 of FIG. 3 and the USB port 932 corresponds to the USB port 312 of FIG. 3.

The HPNA port 934 provides HPNA connection to telephone sets. The status and activities of the HPNA connection are indicated by HPNA LEDs (not shown) The HPNA connection is capable of functioning as a PBX or Centrex. In a preferred embodiment, these LEDs correspond to the HPNA link LED 318 and the HPNA activity LED 320 of FIG. 3 and the HPNA port 934 corresponds to the HPNA port 316 of FIG. 3.

The board 936 can be an Ethernet-to-USB/HPNA board. It is an IC board dedicated for the USB and HPNA connections at the USB port 932 and the HPNA port 934, respectively. Preferably, it is an IC board that is separate from the mother board. It communicates with the line interface 928 on the mother board to connect the USB port 932 and the HPNA port 934 to the LAN repeater 926. The LAN repeater 926 ties together the connections from the USB port 932, the HPNA port 934, and the Ethernet jacks 930, establishing a local area network (LAN). The LAN repeater 926 communicates with the microcontroller 918 so that signals from the xDSL transceiver 906 and PCMCIA cards at the PCMCIA sockets 910 can be passed to the LAN and signals from the LAN can be passed to the xDSL transceiver 906 and PCMCIA cards at the PCMCIA sockets 910. Also, the LAN repeater 926 is connected to a LAN oscillator 940 which serves as a clock for the LAN repeater 926. Preferably, the LAN oscillator 940 is a 25 MHz oscillator and the LAN repeater 926 is a Hex repeater with 6 ports, of which 4 ports are for Ethernet connections, one port is for a USB connection, and one port is for an HPNA connection.

The access device 900 may additionally comprise DSL LED 942, PCMCIA LEDs 944, microcontroller oscillator 946, momentary switch 948, and DIP header 950. These components communicate with the microcontroller 918. The DSL LED 942 indicates the status and activities of the DSL connection. In a preferred embodiment, it corresponds to the DSL LED 206 of FIG. 2. The PCMCIA LEDs 944 indicate the status and activities of the PCMCIA connections. In a preferred embodiment, they correspond to the first and second PCMCIA LEDs 208 and 210 of FIG. 2, The DIP header 950 is connected to an internal background debug interface (not shown) for the purpose of debugging in the background. The momentary switch 948 is for the purpose of resetting the microcontroller 918 to a default, or initial, state. The microcontroller oscillator 946 serves as a clock of the microcontroller oscillator 946 and is preferably a 3–5 MHz oscillator. Momentary switches and DIP headers are well known in the art.

The access device 900, as shown in FIG. 9, may also comprise an expansion bus interface 962. It communicates with both the microcontroller 918 and the FPGA 908. It is also for the purpose of communicating with expanded components, such as the components for audio-in and voice functions, which will be discussed below in relation to FIG. 10.

The power supply system of the access device 900 includes, as shown in FIG. 9, a power port 952, a power supply 954, and a power LED 956. The power port 952 receives power from a power cord plugged into a conventional socket. The power supply 954 outputs the power at a plurality of voltages to drive to different components. The power LED 956 indicates the status of power connection. In a preferred embodiment, the power LED 956 corresponds to the power LED 204 of FIG. 2. Also, the power port 952 receives a power cord from a power adapter, preferably with 24V AC transformer. In a preferred embodiment, it corresponds to the power adapter port 304 of FIG. 3. In addition, power supply 954 output power at a plurality of voltages such as +30V DC, +5V DC, +3.3V DC, +2.5V DC, and ±12V DC.

Through a combination of software and hardware connections to the CPU, all LAN port connections are bridged together in the access device. Thus, the wireless LAN, HPNA, USB and Ethernet ports all act as a single logical connection to the end user enabling Dynamic Host Configuration Protocol (DHCP) such that all bridging and routing protocols have the same appearance.

The flexible nature of an access device in accordance with the present invention allows for a variety of connectivities and protocols. A wide variety of optional "user-pluggable" boards may be used with the access device of the present invention. One such board is a modular WAN interface "plug in card" which may be configured for ADSL, G.SHDSL, VDSL, ISDN BRI/PRI and cable modem front ends. Another is a modular WAN interface which includes HomePNA 2.0 or HPNA 2.0, USB and/or powerline, Still another is a board with low speed telemetry port which may have serial connections installed for telemetry/meter reading/internet appliances, and low power RF modules which plug in and provide low speed wireless connectivity(<100 kbps), or remote wireless meter reading capability. The two Type II PCMCIA or cardbus slots also allow for expansion to such capabilities as wireless LAN, harddisk, and HPNA 2.0, among others.

Figure 10:
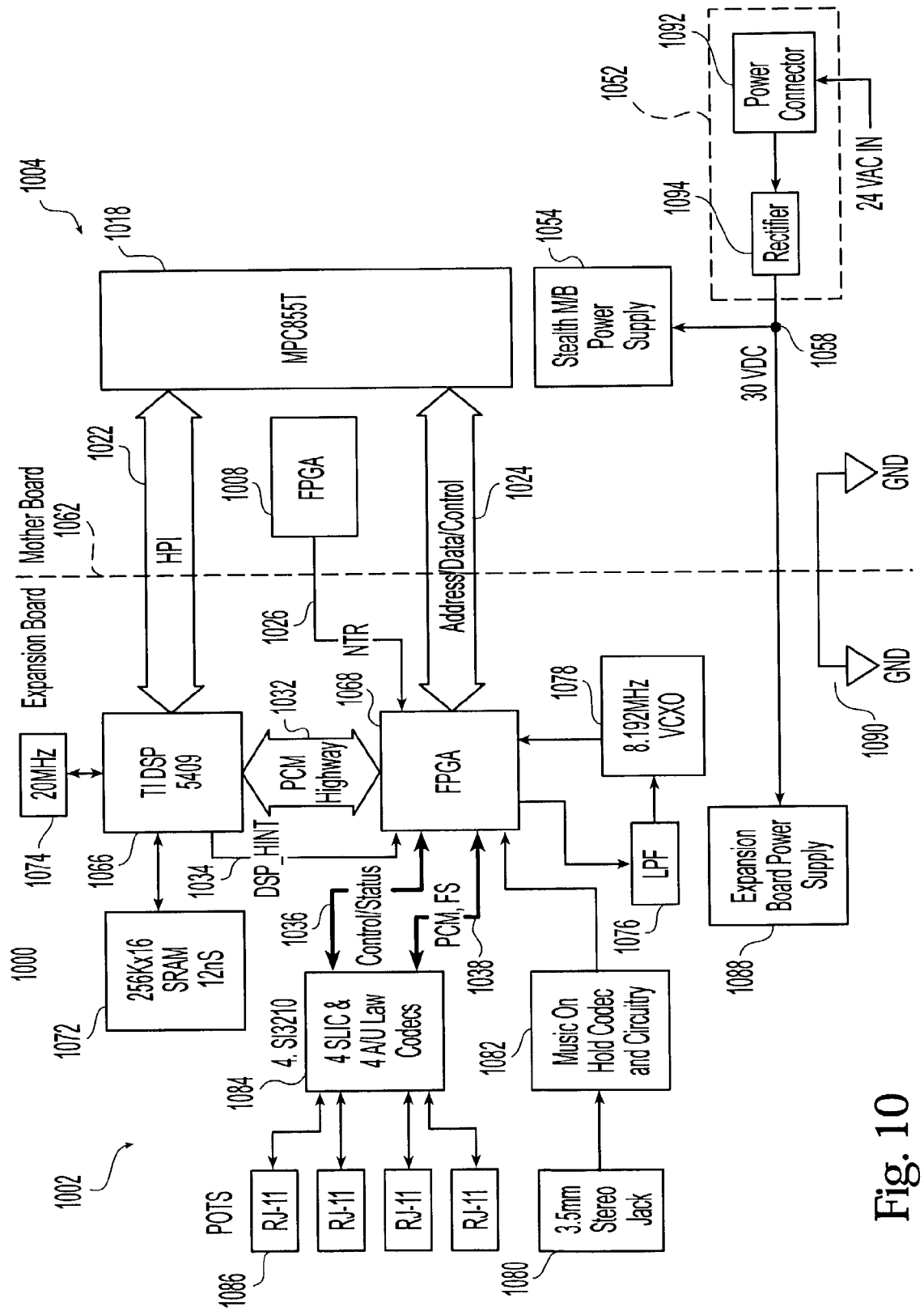
FIG. 10 is a block diagram of another embodiment of the access device in accordance with the present invention.

FIG. 10 is a block diagram of another embodiment of the access device in accordance with the present invention. It shows the major components on an expansion board 1002, used in conjunction with the mother board 1004, of the access device. As shown in FIG. 10, access device 1000 comprises an expansion bus interface 1062, designated by the vertical dashed line, which corresponds to the expansion bus interface 962 of FIG. 9. The expansion bus interface 1062 provides communication between the mother board 1004 on the right hand side of FIG. 10 and the expansion board 1002 on the left hand side of FIG. 10. Preferably, the expansion bus interface 1062 comprises a host processor interface (HPI) 1022, a ADC (address/data/control) interface 1024, and a network timing reference (NTR) 1026. The mother board 1004 comprises a mother FPGA 1008, a microcontroller 1018, a power port 1052, and a power supply 1054, corresponding to the FPGA 908, microcontroller 918, power port 952, and power supply 954, respectively, of FIG. 9. In addition, the mother board 1004 also comprises a power expansion connector 1058, which supplies power to the expansion board 1002. The power port 1052 receives power from a power input 1092 rectified by a rectifier 1094. Preferably, the power expansion connector 1058 supplies a 30V DC power to the expansion board 1002.

The expansion board 1002 of the access device 1000 provides audio and voice functions. As shown on the left hand side of FIG. 10, it comprises a digital signal processor (DSP) 1066 and an expansion FPGA 1068. The expansion FPGA 1068 serves as a pulse code modulation (PCM) interface between incoming audio-in and voice signals and the DSP 1066. The DSP 1066 and expansion FPGA 1068 communicate with each other and with the mother FPGA 1008 and the microcontroller 1018 to process the incoming audio-in and voice signals. Specifically, the DSP 1066 and expansion FPGA 1068 communicate with each other via a PCM Highway bus 1032. The PCM Highway bus comprises multiple channels. For example, it may comprise 24 channels. The DSP 1066 also communicates with the expansion FPGA 1068 through a DSP_HINT bus 1034. In addition the DSP 1066 communicates with the microcontroller 1018 through the HPI 1022 and the expansion FPGA 1068 communicates with the microcontroller 1018 through the ADC (address/data/control) interface 1024. Further, the expansion FPGA 1068 communicates with the mother FPGA 1008 through the NTR 1026. Preferably, the DSP 1066 comprises TI DSP 5409 multi-channel buffered serial ports (MCBSPs). Table 6 lists the preferred products for the major components shown in FIG. 10, except those well known in the art.

The DSP 1066 is connected to a SRAM 1072 for expanded memory. Preferably, SRAM 1072 is a 12nS 256K×16 SRAM. The DSP 1066 is also connected to an DSP oscillator 1074 which serves as a clock for the DSP 1066. Preferably, the DSP oscillator 1074 is a 20 MHz oscillator.

The expansion FPGA 1068 communicates with a low pass filter (LPF) 1076 and an expansion FPGA oscillator 1078. The LPF 1076 serves as a loop for the purpose of controlling timing. The expansion FPGA oscillator 1078 serves as a clock for the expansion FPGA 1068. Preferably, the expansion FPGA oscillator 1078 is an 8.192 MHz voltage control crystal oscillator (VCXO oscillator). However, one skilled in the art can use other means, such as a network timing reference (NTR) or adaptive timing recovery, to serve as a clock for the expansion FPGA 1068.

For music-on-hold, the access device 1000 further may comprise an audio-in port 1080, in the form of a conventional stereo jack or the like. As shown in FIG. 10, the audio-in in port 1080 provides connection to and receives audio-in signals. It feeds the signals to a music coder-decoder (Codec) 1082. The music Codec 1082 performs tho conversion between analog sound and digital codes and communicates with the expansion FPGA 1068 to process the incoming audio-in signals. Preferably, the audio-in port 1080 is a 3.5 mm stereo jack and supports 8 kHz sampled music. In a preferred embodiment, the audio-in port 1080 corresponds the audio-in port 326 of FIG. 3.

The access device 1000, as shown in FIG. 10, flier comprises a voice slot 1086 and a voice codec 1084. The voice slot 1086 receives voice services, such as telephone services, including VoIP and VoATM, using a variety of protocols including MGCP, SIP, H.323, and H.248, which are standards well known in the industry The voice codec 1084 registers voice signals and performs the conversion between sound analog and digital codes. It communicates with the expansion FPGA 1068 through a control/status bus 1036 and a PCM and Frame Sync (FS) bus 1038. Preferably, the voice slot 1086 consists of 4 plain old telephone service (POTS) RJ-11 jacks and the voice codec 1084 contains 4 SI-3210 codecs which include 4 subscriber line interface circuits (SLICs) and 4 A/U-Law codecs. The codec options include G.711, G.726, G.723.1, G.729A and G.728. The voice codes 1084 is capable of supporting call progress tones out of band with actual transmission and reception taking place via the programmable SLIC. Also, the voice codes 1084 comprises a voice coder (vocoder) to support VoIP/VoATM. In a preferred embodiment, the voice slot 1086 corresponds to the voice slot 324 of FIG. 3.

The access device 1000 may her comprise an expansion board power supply 1088, which receives power from the power expansion connector 1058 and supplies power to various components of the expansion board 1002. The mother board 1004 and the expansion board 1002 are grounded by common ground 1090.

TABLE 6

Preferred major components shown in FIG. 10.

| Component | Preferred product |
| --- | --- |
| DSP 1066 | TI DSP 5409 (MCBSPs). |
| SRAM 1072 | 12 nS 256K × 16 SRAM. |
| DSP oscillator 1074 | 20 MHz oscillator |
| expansion FPGA oscillator 1078 | 8.192 MHz VCXO oscillator |
| audio-in port 1080 | 3.5 mm stereo jack |
| voice slot 1086 | RJ-11 jack |
| voice codec 1084 | SI-3210 codec |

As discussed above, an access device according to the present invention may use a single DSL line, which can carry both voice and data signals simultaneously. Sometimes, the voice and data signals interfere with each other, producing unwanted noise in the voice transmission. Therefore, when the access device is used for both voice and data signals over a single DSL line, an additional device is needed to minimize the interference.

The options available for this additional device include a plain old telephone service (POTS) splitter and microfilters, both of which are well known in the art A POTS splitter splits the incoming signals over the DSL line and sends the signal out through its voice or data port, based on the signal's frequency. Alternatively, a microfilter can be used at each telephone wall jack connected to the DSL. It filters out high frequencies associated with data signals and pass only low frequencies associated with voice signals to a telephone set.

Figure 11:
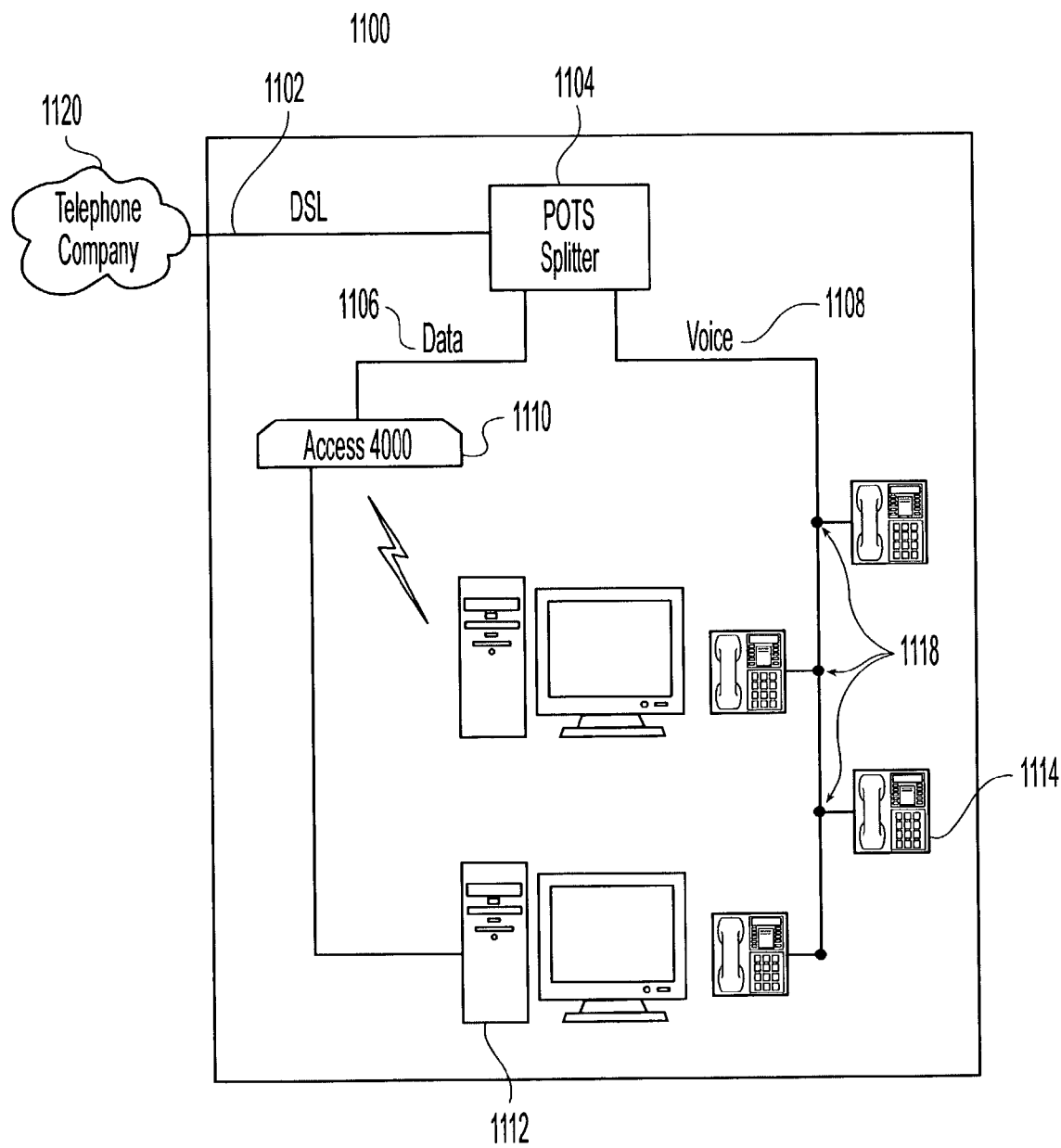
FIG. 11 shows an access system which incorporates an access device according to the present invention with a POTS splitter.

FIG. 11 shows an access system which incorporates an access device according to the present invention with a POTS splitter. As shown in FIG. 11, the access system 1100 comprises a DSL line 1102, a POTS splitter 1104, a data line 1106, a voice line 1108, an access device 1110, computers 1112, telephone sets 1114, and jacks 1118. The DSL line 1102 receives DSL transmission from a DSL service provider, such as a telephone company 1120, and passes DSL signals to the POTS splitter 1104. The POTS splitter 1104 splits the incoming DSL signals based on their frequencies and sends voice signals to the voice line 1108 and data signals to the data line 1106. The data line 1106 passes the data signals to the access device 1110 which is wired or wirelessly connected to computers 1112. The voice line 1108, on the other hand, passes the voice signals to the jacks 1118, from which the telephone sets 1114 are connected.

Figure 12:
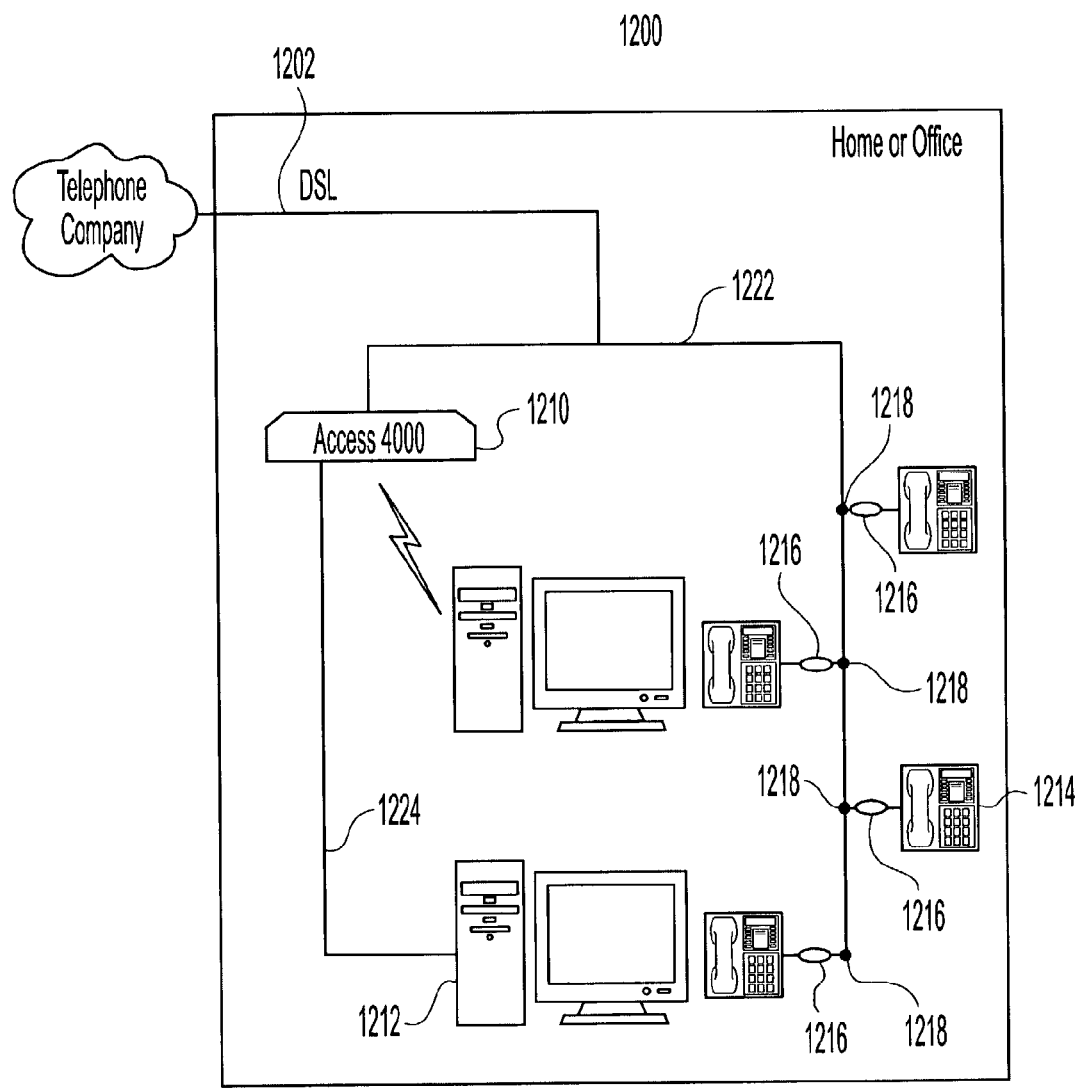
FIG. 12 shows an access system which incorporates an access device according to the present invention with micro-filters.

FIG. 12 shows an access system which incorporates an access device according to the present invention with microfilters. As shown in FIG. 12, the access system 1200 comprises a DSL line 1202, an access device 1210, computers 1212, telephone sets 1214, microfilters 1216, and jacks 1218. The DSL line 1202 receives DSL transmission from a DSL service provider, such as a telephone company 1220, and passes DSL signals to the access device 1210. The access device 1210 is wired or wirelessly connected to computers 1212 through LAN 1224. The DSL line 1202 also passes DSL signals to the jacks 1218 through twisted pair 1222. Each telephone set 1214 is connected to a jack 1218 through a microfilter 1216. The microfilter 1216 filtes out high frequencies associated with data signals and pass only low frequencies associated with voice signals to the telephone set 1214.

From a user's perspective, the access device can be treated as a modem with extended functionalities. By making appropriate connections according to the discussions above, a user may use it for a variety of purposes. Referring to FIG. 3, for example, a user may connect an ADSL phone line cable to the DSL port 308, a power cable with a 24V DC adapter to the power adapter port 304, and a computer with an Ethernet cable to the Ethernet port 310. Also, the user may install a POTS splitter before the access device, as discussed above in relation to FIG. 11, or microfilters before telephone sets, as discussed in relation to FIG. 12.

If needed, the user may also plug a telephone line into the first jack 316B of the dual HPNA ports 316, referring to FIG. 3, and lead an HPNA cable from the second jack 316A to a telephone set or a telephone wall jack. The user may also connect a computer to the USB slot 312 through a USB cable. The USB slot 312 may also be used for wireless communications. For this purpose, an access HRF USB adapter can be connected to a remote computer. The USB adapter uses RF to communicate, trough the access device of the present invention, with other computers connected to the access device. Also, the user may connect the serial port 322, the coice slot 324, or the audio-in port 326 appropriately, as discussed above, if telemetry services, telephony services, or music-on-hold services, respectively, are desired.

To obtain various functions, the user may, for example, plug in up to two PCMCIA cards into the first and second PCMCIA ports 216 and 218 of FIG. 2. The user may plug in different PCMCIA cards for different purposes and change PCMCIA cards as needed. For example, for wireless communications from a laptop computer to other computers connected to the access device, the user may plug in a WLAN PCMCIA card. Meanwhile, the user may fit an access HRF PCMCIA card adapter into the laptop computer's PCMCIA socket that supports the HRP PCMCIA card. The PCMCIA adapter uses RF to communicate, through the access device, with other computers connected to the access device.

To download various software and drivers or to upgrade the access device, a user can use floppy disks, CDs, or a network connected to a provider of such services. The software is downloaded to a client computer which is connected to the access device. The client computer communicates with the access device to upgrade, or even change the personality of, the access device. In other words, the access device can be upgraded and/or configured according to one's needs.

To have access to the Internet through the access device, a computer needs to have a browser, preferably Microsoft® Internet explorer 4.0 or later, or Netscape® navigator 4.0 or later. The minimum networking requirement for a computer includes a 486/66 MHz processor, Windows 98 or Windows ME., a 16 MB RAM, a 10 MB of available hard disk space.

The minimum requirement also includes an available USB port, an available HPNA port an available PCMCIA slot, or an Ethernet port. The extra requirement for wireless networking includes an access HRF USB adapter or an access HRF PCMCIA card.

Figure 13:
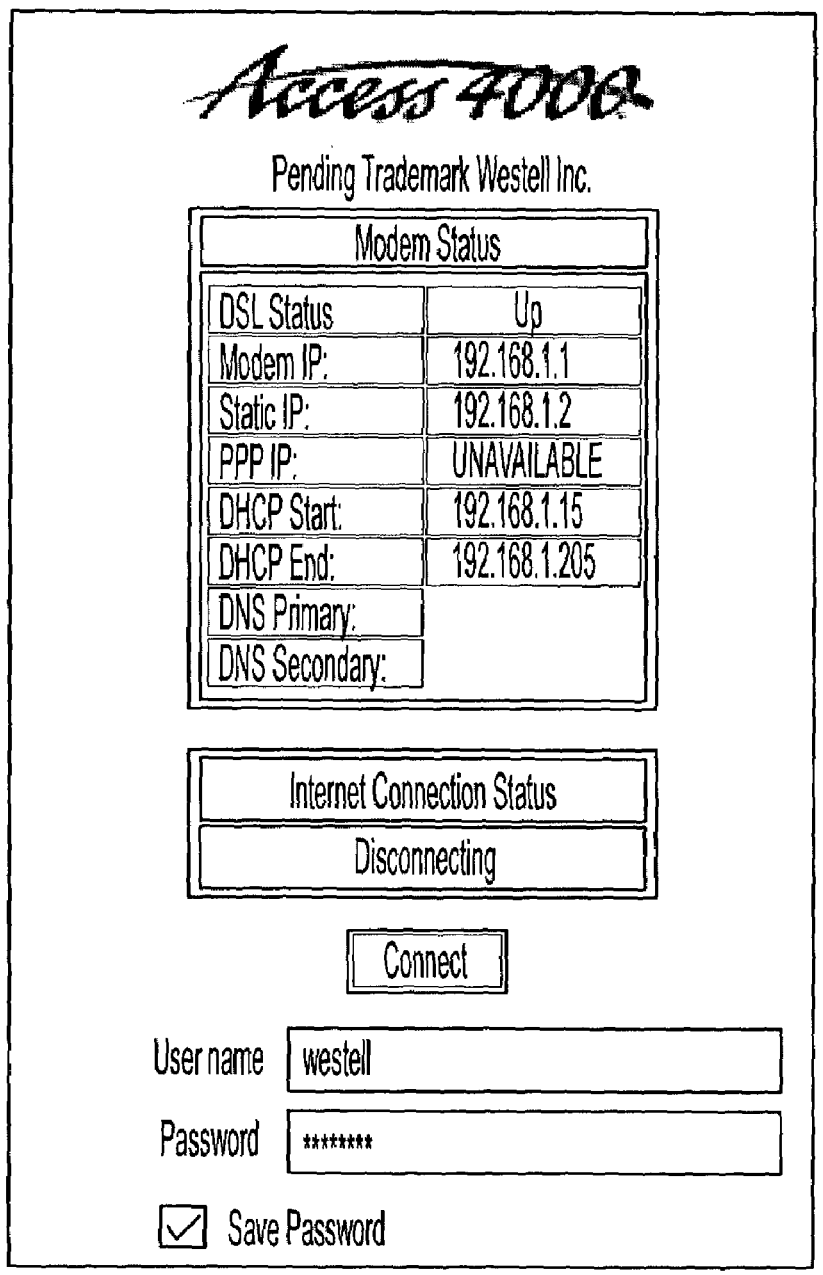
FIG. 13 shows a sample on-screen installation instructions window.

Certain software needs to be installed on a client computer for accessing the access device. An installation CD containing a software package for this purpose is equipped with the access device of the present invention For example, software is needed for the use of the USB port. To install the USB software, a user inserts the installation CD into the computer after connecting the USB cable between the USB port of the access device and the USB port on the computer and after starting Windows 98 or Windows ME. An "Add New Hardware Wizard" window will appear, as shown in the example in FIG. 13 with on-screen installation instructions for the user to follow.

Figure 14:
FIG. 14 shows a sample home page of the access device containing on-line configuration instructions for a user to configure the access device.

Before use, the access device needs to be configured. To configure the access device, a user needs to connect a client computer to the access device and connect the access device to a DSL line. Using the modem feature of the access device, the user uses the web browser on the computer to access a specified home page designated for the access device of the present invention. The URL of the home page is http: 192.168.1.1.:8080. The home page, as shown in the example in FIG. 14, provides on-line configuration instructions for the user to configure the access device. The configuration makes the access device a scalable xDSL modem with modular WAN interface plugin card, which may be configured as ADSL, G.SHDSL, VDSL, ISDN BRI/PRI, or cable modem front end.

Figure 15:
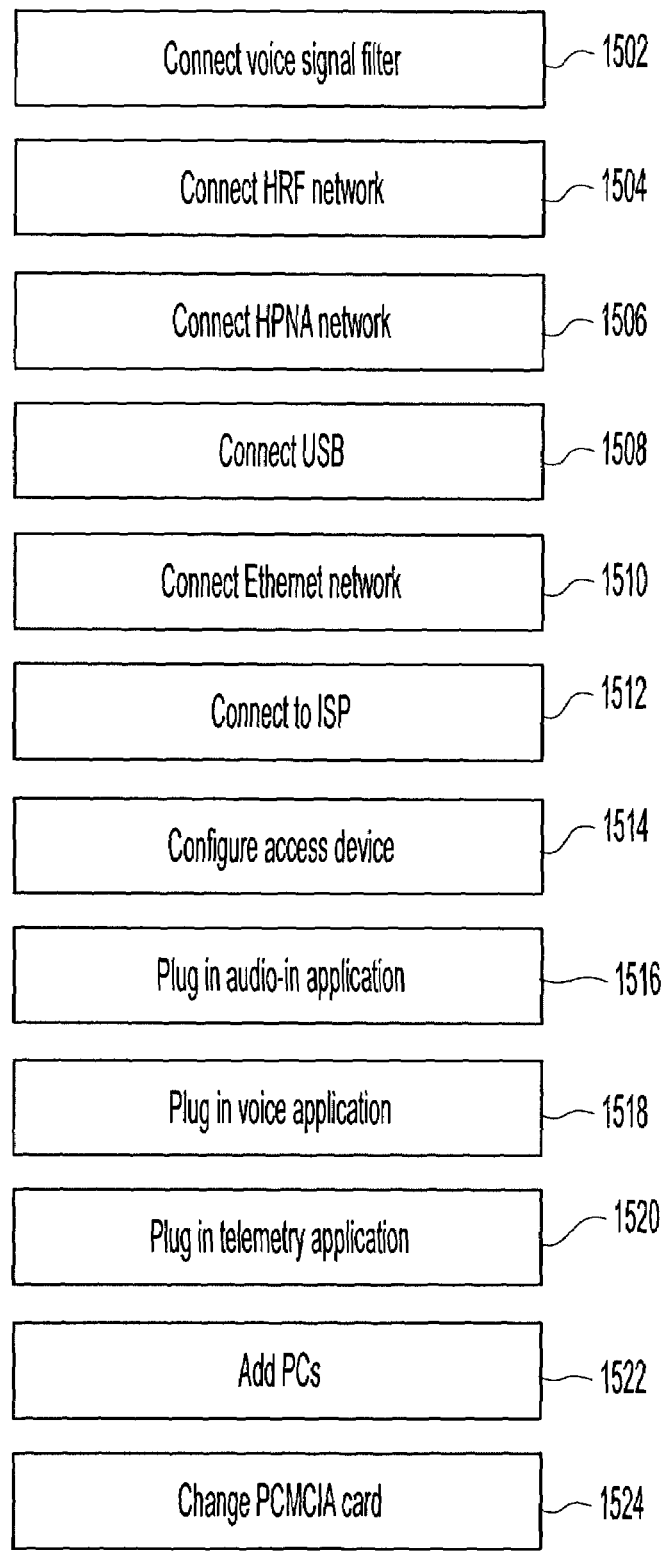
FIG. 15 is a flow chart summnzing the installation procedure and use of the access device according to the present invention.

FIG. 15 is a flow chart summarizing the installation procedure and the use of the access device according to the present invention. The access device can be considered as a "super modem". The access device is flexible enough to satisfy most networking by serving as a gateway for a home or a small office. The network established by the access device enables a single DSL line to be shared by multiple platforms.

As shown in FIG. 15, at step 1502, a user filters voice signals. If the user uses a DSL line only for data transmission, the user can skip to step 1504. On the otherhand, if the user uses the DSL line for both data and voice transmission, the user installs either a POTS splitter between the DSL line and the access device or a microfilter at each phone jack.

Steps 1504 through 1510 are to connect various options provided by the access device. These options are for the basic use of the access device. Steps 1516 through 1524 are to use the expanded options provided by the access device.

At step 1504, the user may connect HRF network for wireless networking. In this step, the user plugs in an HRF PCMCIA card into one of the two PCMCIA slots, attaches an antenna to the PCMCIA card, installs an HRF device on the PC to be used in the wireless network, and installs an HRF PCMCIA driver on the PC from an installation CD or disk. The wireless networking enables telecommuting.

At step 1506, the user may connect HPNA network. In this step, the user connects an HPNA cable between the HPNA connector on the access device to one of the two outlets of a dual jack. The dual jack receives input from a DSL line, through a POTS splitter if the DSL line carries both data and voice signal. The other outlet of the dual jack is connected to the DSL port of the access device.

At step 1508, the user may connect USB network. In this step, the user connects a PC to the USB port of the access device.

At step 1510, the usermay connect Ethernet network. In this step, the user connects a PC to any one of the 4 Ethernet ports on the access device, The user also equips the PC to be so connected with an Ethernet card.

At step 1512, the user connects to an Internet service provider (ISP). For example, the user may connect to the Westell website for Internet services.

At step 1514, the user configures the access device. In this step, the user uses a PC that has been connected to the access device, points to the URL of a designated ISP, such as Westell, gets on-screen and step-by-step instructions, and configures the access device. At this point, the installation of the access device is complete and the user can use the established connections, such as the wireless connection, the USB connection, the Ethernet connection, or the HPNA connection for home networking applications or small office networking applications.

At step 1516, the user may connect an audio-in application at the audio-in port of the access device. For example, the user can connect a radio to the access device for a radio-on-hold application.

At step 1518, the user may connect a voice application such as VoIP and VoATM application, to a voice port of the access device. Also, the user may use a voice port of the access device for video applications.

At step 1520, the user may make a connection to the telemetry port of the access device for telemetry applications, such as a remote control, a utility meter, and a security monitor. For example, a remote control application enables the access device to be remotely controlled, a utility meter enables a remote reading of a utility meter, such as a gas meter, and a security monitor enables a remote monitoring of a home security system.

At step 1522, the user may add PCs to the network. The user may use any of the connection options to expand the network by adding more PCs, phone sets, or peripherals, At step 1524, the user may plug in a PCMCIA to a PCMCIA port on the access device. The PCMCIA card can carry any application supported by the access device. Also, the user can change a PCMCIA card for different applications. This modular feature makes it possible to change the "personality" of the access device without having to make physical changes to the access device itself. It also makes it possible to upgrade the access device by a simple PCMCIA card swapping, without having to make physical changes to the access device.

It should be kept in mind that the order of the steps presented in FIG. 15 is not critical. It should also be kept in mind that an access device need not have all the functionalities implied by the steps, and so one or more of the steps may not been available on some access devices.

Finally, while the invention has been described and illustrated herein with respect to preferred embodiments, it should be apparent that various alternatives, modifications, adaptions, and variations will be apparent to those skilled in the an and may be made utilizing the teachings of the present disclosure without departing from the scope of the invention and are intended to be within the scope of the invention as defined by the claims herein.

What is claimed is:

1. An xDSL modem comprising:
   a controller having a computer memory associated therewith;
   software resident in said computer memory, said software comprising preloaded software drivers configured to support a plurality of PCMCIA cards;

at least one PCMCIA slot accessible from an exterior surface of the modem, and at least one port configured to accept a new software driver suitable for cooperating with a PCMCIA card for which no suitable software driver is already resident in said computer memory, wherein upon insertion of a PCMCIA card, a proper software driver is automatically invoked, if said proper software driver is resident in said computer memory.

2. The xDSL modem according to claim 1, comprising at least two PCMCIA slots, each of which is accessible from an exterior surface of the modem.

3. The xDSL modem according to claim 1, wherein said preloaded software drivers include software drivers for protocols from the group consisting of Bluetooth, IEEE802.11a, IEEE802.11b, HomeRF, HiperLAN, and HiperLAN2.

4. An xDSL modem comprising:

a motherboard having a controller having a first computer memory associated therewith; and at least one voice expansion slot connected to the motherboard, wherein the xDSL modem is convertible into a voice-capable device upon insertion of a voice card in the voice exoansion slot;

wherein the voice card includes at least one digital signal processor (DSP) unit and at least one subscriber line interface circuits (SLIC), and wherein the voice card is configured to support at least one coder-decoder (codec) standard and at least one voice protocol.

5. The xDSL modem according to claim 4, wherein the at least one codec standard is two or more from the group consisting of G.711, G.726, G.723.1, G.729A and G.728.

6. The xDSL modem according to claim 4, wherein the at least one voice protocol is two or more from the group consisting of MGCP, SIP, H.323, H.248/MEGACO.

* * * * *